(12) United States Patent
Cheng

(10) Patent No.: US 10,603,749 B2
(45) Date of Patent: Mar. 31, 2020

(54) POSITIONING STRUCTURE OF FRAME WELDING ASSEMBLY FOR METAL PRODUCT

(71) Applicant: WIRE MASTER INDUSTRY CO., LTD., Changhua County (TW)

(72) Inventor: Hsi-Ming Cheng, Changhua County (TW)

(73) Assignee: WIRE MASTER INDUSTRY CO., LTD., Changhua County (TW)

(*) Notice: Subject to any disclaimer, the term of this patent is extended or adjusted under 35 U.S.C. 154(b) by 282 days.

(21) Appl. No.: 15/800,672

(22) Filed: Nov. 1, 2017

(65) Prior Publication Data

US 2019/0126412 A1   May 2, 2019

(51) Int. Cl.
| | |
|---|---|
| B23K 37/00 | (2006.01) |
| B23K 13/00 | (2006.01) |
| B23K 37/04 | (2006.01) |
| B23K 33/00 | (2006.01) |
| B23K 20/10 | (2006.01) |
| B23K 13/04 | (2006.01) |
| B23K 20/22 | (2006.01) |
| B23K 20/24 | (2006.01) |
| B23K 13/01 | (2006.01) |

(52) U.S. Cl.
CPC ............ B23K 37/04 (2013.01); B23K 13/015 (2013.01); B23K 13/043 (2013.01); B23K 20/10 (2013.01); B23K 20/22 (2013.01); B23K 20/24 (2013.01); B23K 33/004 (2013.01); B23K 13/00 (2013.01)

(58) Field of Classification Search
None
See application file for complete search history.

(56) References Cited

U.S. PATENT DOCUMENTS

| | | | | |
|---|---|---|---|---|
| 2,219,595 A | * | 10/1940 | Lang | B21D 11/203 228/142 |
| 3,442,311 A | * | 5/1969 | Rhyne | B27F 1/00 144/354 |
| 4,796,541 A | * | 1/1989 | Halstrick | A47B 57/402 108/107 |
| 5,357,728 A | * | 10/1994 | Duncanson | A47B 47/042 52/592.4 |
| 5,927,893 A | * | 7/1999 | Imamura | B23K 37/0426 403/270 |
| 6,185,899 B1 | * | 2/2001 | De Niet | A47F 5/0846 211/187 |
| 6,196,401 B1 | * | 3/2001 | Brady | A47F 1/121 211/186 |

(Continued)

Primary Examiner — Devang R Patel
(74) Attorney, Agent, or Firm — Chun-Ming Shih; Lanway IPR Services

(57) ABSTRACT

A positioning structure of a frame welding assembly for a metal product, the metal product is a holding plate or a holding basket made of metal mesh and contains: multiple bodies, each of the multiple bodies is folded in a square shape and includes multiple raised faces and multiple slots which are stamped on a peripheral side of each body respectively. Two adjacent of the multiple bodies are connected together, and the two adjacent bodies have multiple recesses and multiple protrusions respectively formed on two connection sides thereof so that the multiple recesses retain with the multiple protrusions individually before welding the two adjacent bodies together.

4 Claims, 7 Drawing Sheets

(56) References Cited

U.S. PATENT DOCUMENTS

| | | | |
|---|---|---|---|
| 7,780,061 B2* | 8/2010 | Helvey | B23K 20/1205 228/112.1 |
| 2015/0084254 A1* | 3/2015 | Southwell | B23K 37/0452 269/17 |

* cited by examiner

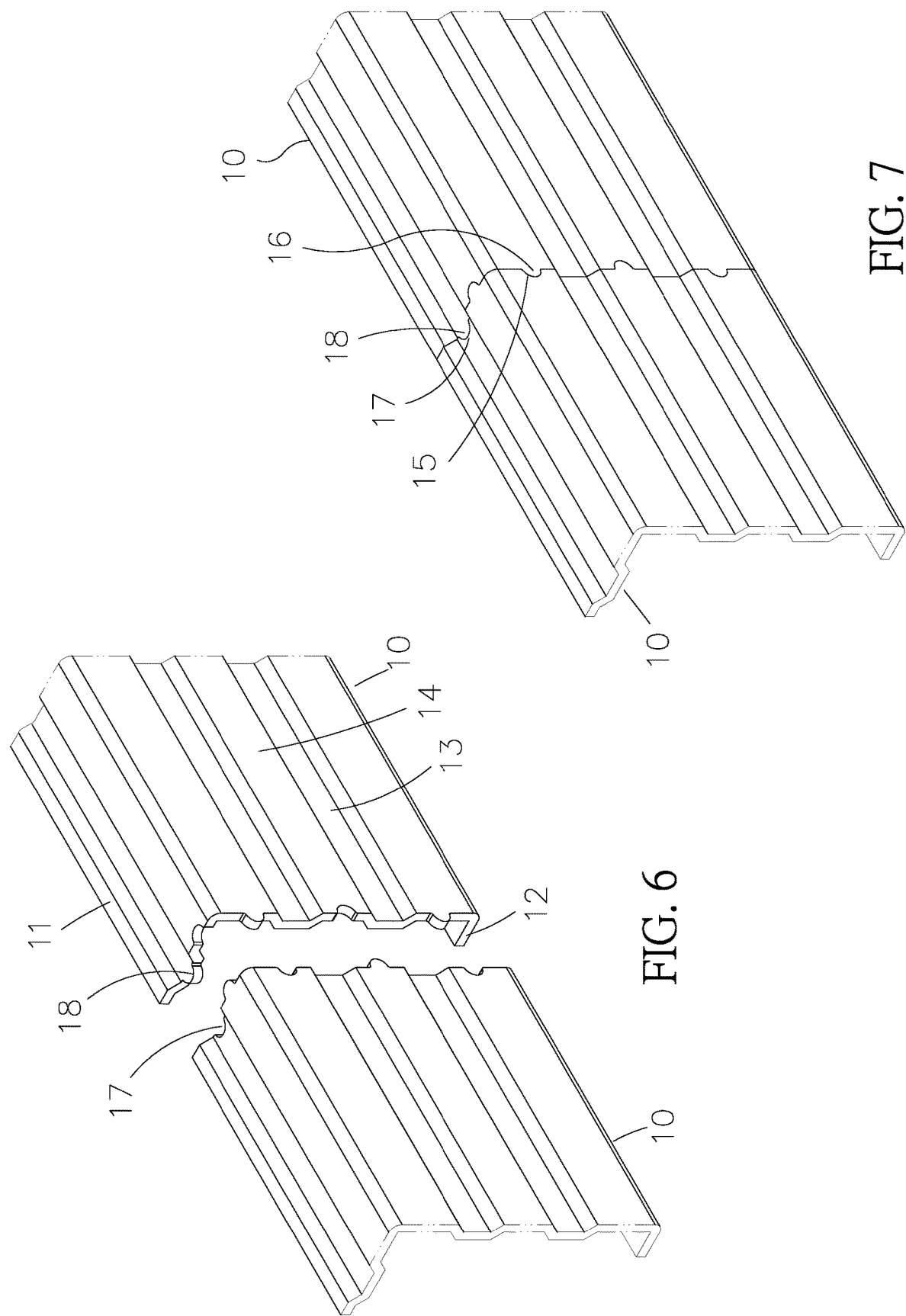

US 10,603,749 B2

POSITIONING STRUCTURE OF FRAME WELDING ASSEMBLY FOR METAL PRODUCT

FIELD OF THE INVENTION

The present invention relates to a positioning structure of a frame welding assembly for metal product (such as a holding plate or a holding basket made of metal mesh) in which the multiple recesses retain with the multiple protrusions individually before welding, and the two adjacent bodies are high-frequency welded together so as to obtain aesthetic welding appearance.

BACKGROUND OF THE INVENTION

A conventional metal shelf contains holding plates or holding baskets made of metal meshes individually, and the metal meshes are stamped, folded, and flexible. Nevertheless, it is dangerous to injure user or other objects because of sharp edges of the metal meshes. To enhance aesthetic appearance and using safety, peripheral sides of the holding plates or the holding baskets are covered respectively, i.e., the edges of the metal meshes are hidden.

Each of the holding plates or the holding baskets contains peripheral sides folded from a metal sheet, and two connection ends of two adjacent holding plates or holding baskets are welded together, wherein each of the metal meshes has peripheral ribs folded and coupled with each holding plate or holding basket.

However, two connection ends of the two adjacent holding plates or holding baskets are straight, so offset misalignment occurs after welding the two adjacent holding plates or holding baskets together. In addition, welding raised tracks form on the two connection ends of the two adjacent holding plates or holding baskets to cause poor quality and appearance.

The present invention has arisen to mitigate and/or obviate the afore-described disadvantages.

SUMMARY OF THE INVENTION

The primary objective of the present invention is to provide a positioning structure of a frame welding assembly for a metal product which improves offset misalignment of conventional holding plate or a holding basket made of metal mesh as welding two adjacent bodies together so as to avoid welding scars and poor appearance.

Further objective of the present invention is to provide a positioning structure of a frame welding assembly for a metal product which contains multiple protrusions and multiple recesses formed in two adjacent bodies respectively, wherein a height of each of the multiple protrusions is more than a depth of each of the multiple recesses so that when the two adjacent bodies are connected together, the multiple recesses individually retain the multiple protrusions, and the two adjacent bodies are high-frequency welded together to obtain welding quality and aesthetic welding appearance.

Another objective of the present invention is to provide a positioning structure of a frame welding assembly for a metal product which in which the multiple recesses retain with the multiple protrusions individually before welding the two adjacent bodies, and a slit is defined between the two adjacent bodies so as to avoid offset misalignment as welding the two adjacent bodies together, thus obtaining welding quality and aesthetic welding appearance.

BRIEF DESCRIPTION OF THE DRAWINGS

FIG. 6 is a perspective view showing the exploded components of a part of the positioning structure of the frame welding assembly for the metal product according to a second embodiment of the present invention.

FIG. 7 is a perspective view showing the assembly of a part of the positioning structure of the frame welding assembly for the metal product according to the second embodiment of the present invention.

DETAILED DESCRIPTION OF THE PREFERRED EMBODIMENTS

Figure 1:
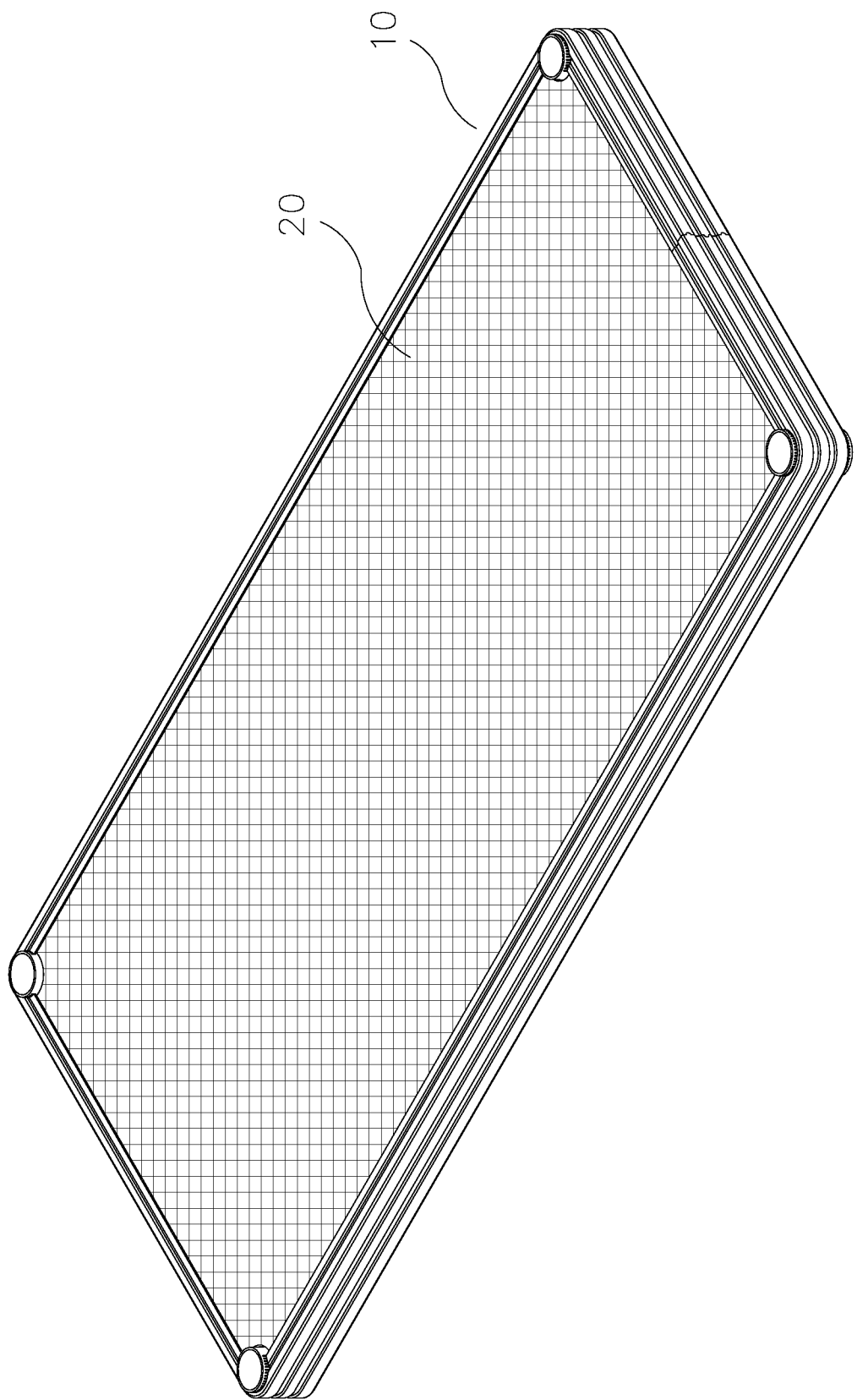
FIG. 1 is a perspective view showing the assembly of a positioning structure of a frame welding assembly for a metal product according to a first embodiment of the present invention.
Figure 2:
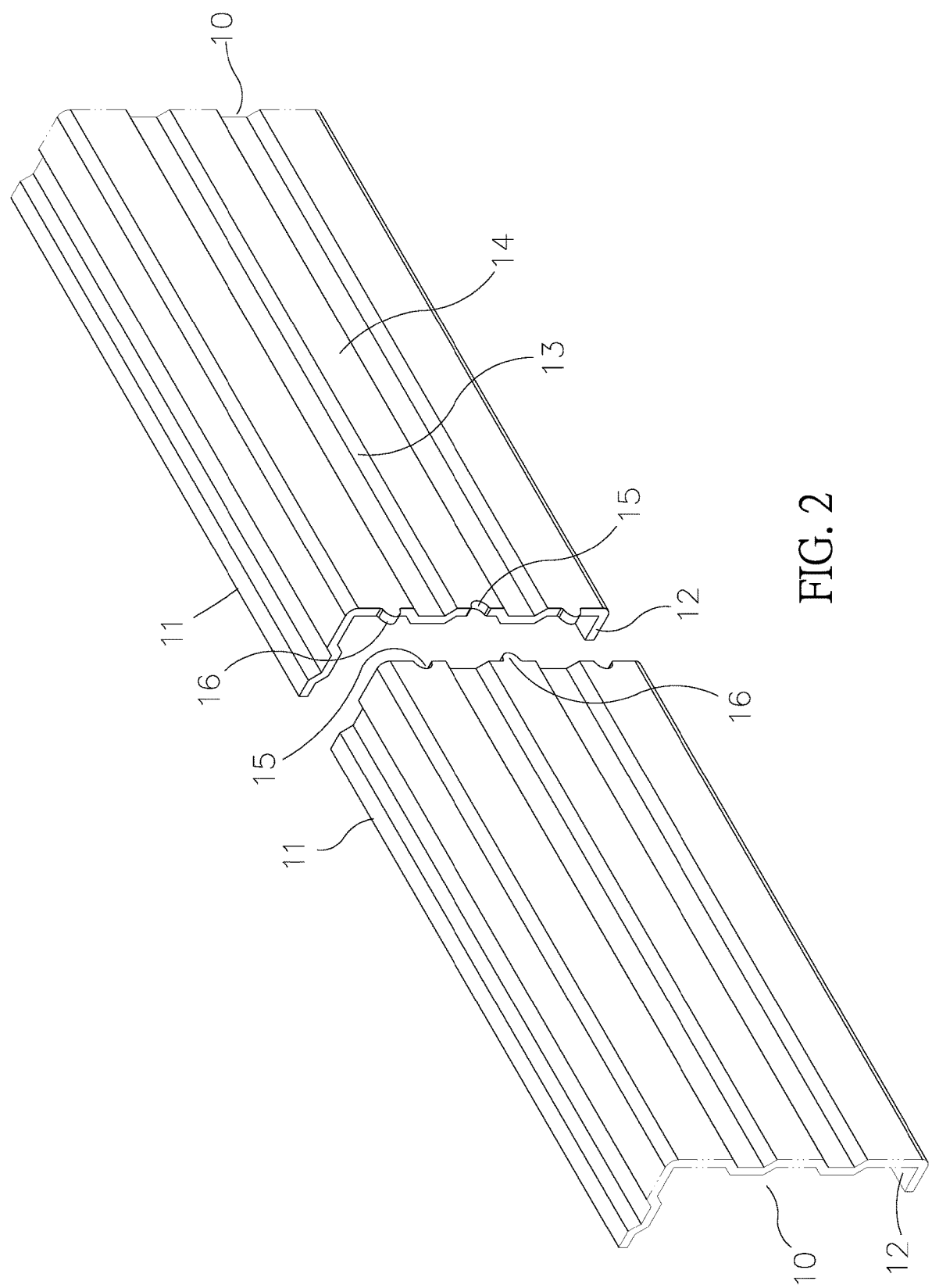
FIG. 2 is a perspective view showing the exploded components of a part of the positioning structure of the frame welding assembly for the metal product according to the first embodiment of the present invention.
Figure 3:
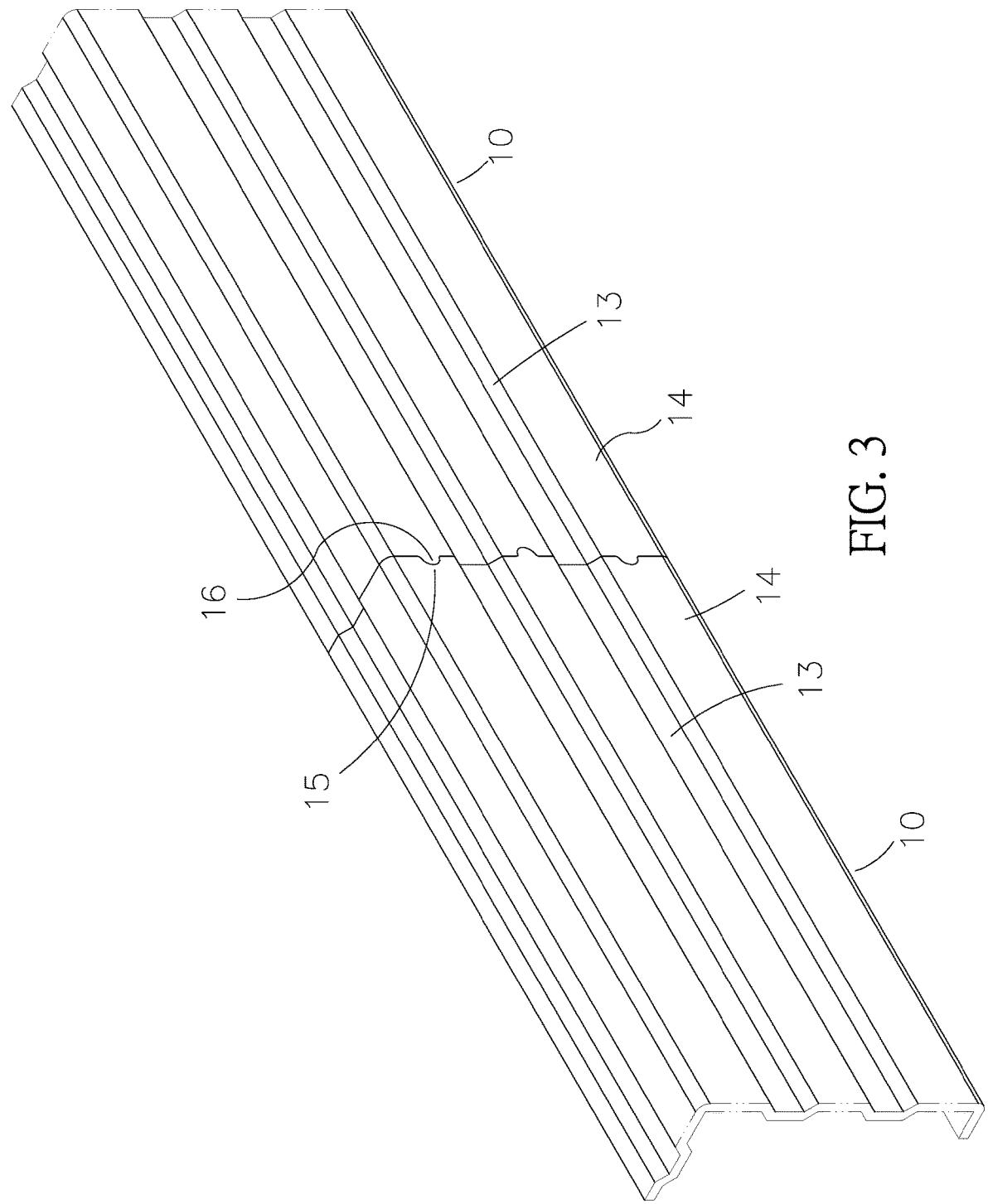
FIG. 3 is a perspective view showing the assembly of a part of the positioning structure of the frame welding assembly for the metal product according to the first embodiment of the present invention.
Figure 4:
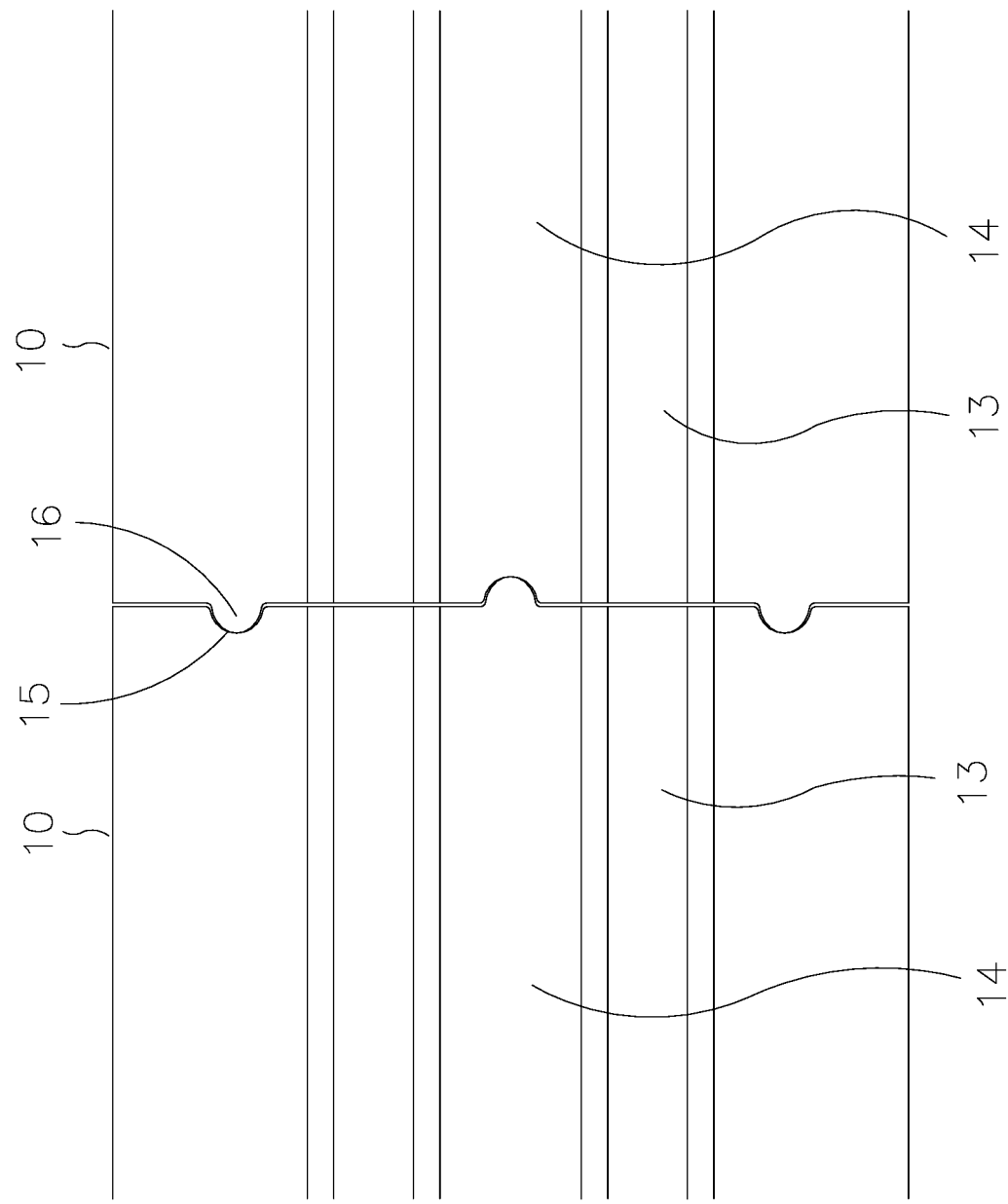
FIG. 4 is a side plan view showing the assembly of a part of the positioning structure of the frame welding assembly for the metal product according to the first embodiment of the present invention.
Figure 5:
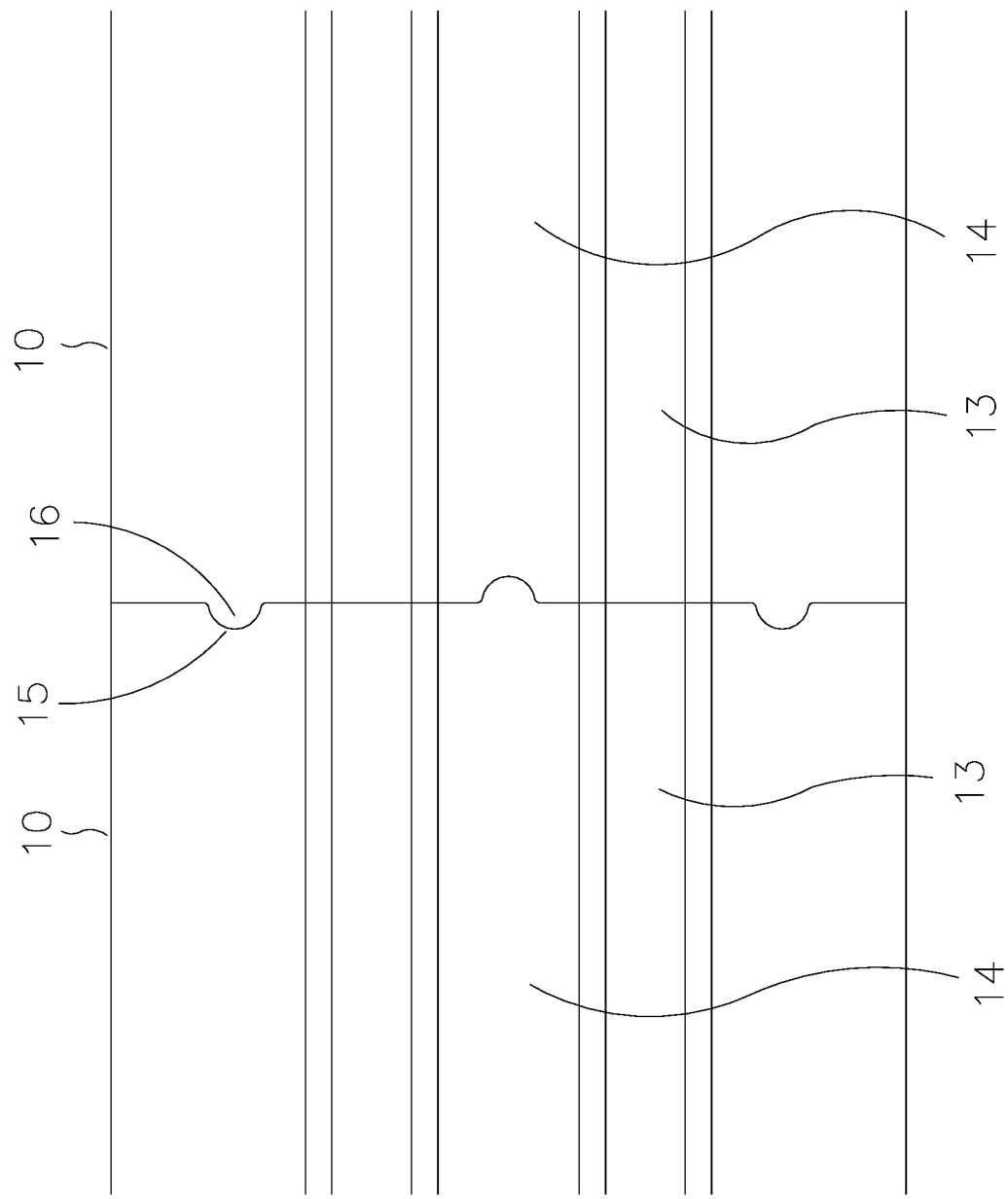
FIG. 5 is another side plan view showing the assembly of a part of the positioning structure of the frame welding assembly for the metal product according to the first embodiment of the present invention.

With reference to FIGS. 1-5, a positioning structure of a frame welding assembly according to a first embodiment of the present invention is applied to a holding plate of a metal shelf and comprises a body 10 stamped in a C shape from a metal sheet, the body 10 includes a first peripheral rib 11 formed on a first end thereof, a second peripheral rib 12 formed on a second end of the body 10, multiple slots 13 stamped on each of a peripheral side of the body 10, the first peripheral rib 11, and the second peripheral rib 12 respectively so as to reinforce the positioning structure, wherein the body 10 is folded in a square shape, and the first peripheral rib 11 is welded with a metal mesh 20 made of metal material, thus producing the holding plate.

Before welding multiple bodies 10 with the metal mesh 20 so as to produce the holding plate, two adjacent of the multiple bodies 10 have multiple recesses 15 and multiple protrusions 16 respectively formed on two connection sides of the two adjacent bodies 10 respectively, and the multiple recesses 15 and the multiple protrusions 16 are alternatively formed on multiple raised faces 14 or the multiple slots 13 on peripheral sides of the two adjacent bodies 10 respectively, wherein a height of each of the multiple protrusions 16 is more than a depth of each of the multiple recesses 15 so that when the two adjacent bodies 10 are connected together, the multiple recesses 15 individually retain the multiple protrusions 16, and a slit is defined between the two adjacent bodies 10. Thereafter, the two adjacent bodies 10 are high-frequency welded together so that the multiple protrusions 16 partially melt and fill into the slit, thus obtaining aesthetic welding appearance.

Referring further to FIGS. 6 and 7, a difference of a positioning structure of a frame welding assembly of a second embodiment from that of the first embodiment comprises: multiple notches 17 and multiple projections 18 formed on two first peripheral ribs 11 and two second peripheral ribs 12 of the two adjacent bodies 10 respectively, hence the two first peripheral ribs 11 and the two second peripheral ribs 12 of the two adjacent bodies 10 are retained and are high-frequency welded matingly so as to obtain secure connection and aesthetic welding appearance of the two adjacent bodies 10.

Figure 8:
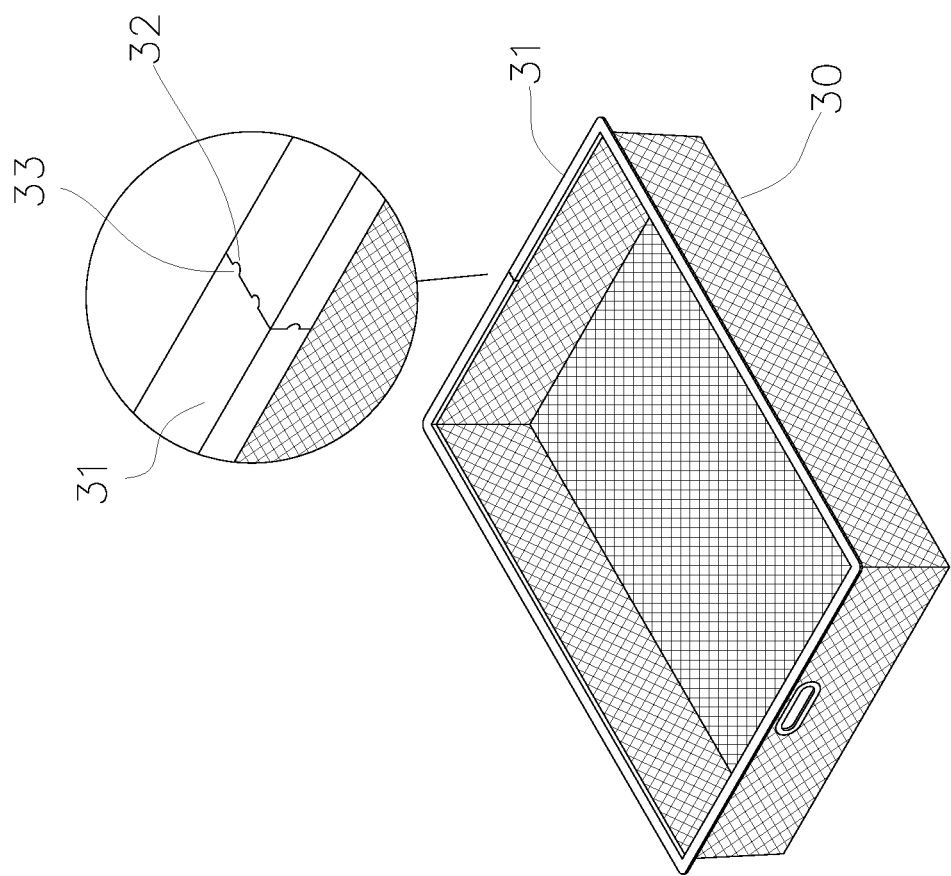
FIG. 8 is a perspective view showing the assembly of a part of the positioning structure of the frame welding assembly for the metal product according to a third embodiment of the present invention.

As shown in FIG. 8, a positioning structure of a frame welding assembly according to a third embodiment of the present invention is applied to a holding basket made from multiple metal meshes. The positioning structure comprises a body 30 folded and stamped from a metal sheet, the body 30 includes a peripheral rib 31 formed around a peripheral edge thereof, multiple notches 32 and multiple projections 33 which are formed on two connection ends of the peripheral rib 31 respectively, hence the multiple notches 32 and the multiple projections 33 of the peripheral rib 31 retain together individually. Thereafter, the two connection ends of the peripheral rib 31 are high-frequency welded so as to produce the holding basket at high quality.

Thereby, the two adjacent bodies of the positioning structure are connected together by retaining the multiple notches with the multiple projections respectively and in high-frequency welding manner, thus enhancing welding quality.

Furthermore, when the two adjacent bodies are connected together, the multiple recesses individually retain with the multiple protrusions, and two adjacent bodies are high-frequency welded together so that the multiple protrusions partially melt and fill into the slit, thus obtaining aesthetic welding appearance.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A welded positioning frame assembly for a metal product, the metal product being a holding plate or a holding basket made of metal mesh and comprising:
   multiple bodies, each of the multiple bodies being folded in a square shape and including multiple raised faces and multiple slots which are stamped on a peripheral side of each body respectively;
   wherein two adjacent of the multiple bodies are welded together, and each of the two adjacent bodies has multiple recesses and multiple protrusions respectively formed on two connection sides thereof so that the multiple recesses interconnect with the multiple protrusions;
   wherein a height of each of the multiple protrusions is more than a depth of each of the multiple recesses so that when the two adjacent bodies are connected together, a slit it defined between the two adjacent bodies and the two adjacent bodies are then welded together so that the multiple protrusions partially melt and fill into the slit.

2. The welded positioning frame assembly as claimed in claim 1, wherein the two adjacent bodies are high-frequency welded together so that the multiple protrusions partially melt and fill into the slit.

3. The welded positioning frame assembly as claimed in claim 1, wherein each body includes at least one peripheral rib and multiple recesses and multiple protrusions formed on the at least one peripheral rib.

4. The welded positioning frame assembly as claimed in claim 1, wherein the multiple recesses and the multiple protrusions are alternatively formed on the multiple raised faces or the multiple slots on peripheral sides of the two adjacent bodies respectively.

* * * * *